(12) United States Patent
Ramsey

(10) Patent No.: US 7,831,911 B2
(45) Date of Patent: Nov. 9, 2010

(54) SPELL CHECKING SYSTEM INCLUDING A PHONETIC SPELLER

(75) Inventor: William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 11/370,816

(22) Filed: Mar. 8, 2006

(65) Prior Publication Data

US 2007/0213983 A1 Sep. 13, 2007

(51) Int. Cl.
G06F 17/20 (2006.01)
G06F 17/21 (2006.01)
G06F 17/27 (2006.01)

(52) U.S. Cl. ............... 715/257; 715/255; 715/256; 715/259; 715/271; 704/254; 704/E15.02; 704/E19.007; 704/E13.001

(58) Field of Classification Search ............... 715/257, 715/255, 256, 259, 271; 704/254, E15.02, 704/E19.007, E13.001
See application file for complete search history.

(56) References Cited

U.S. PATENT DOCUMENTS

| | | | | |
|---|---|---|---|---|
| 4,580,241 A | * | 4/1986 | Kucera | 715/257 |
| 4,730,269 A | * | 3/1988 | Kucera | 715/257 |
| 4,797,855 A | * | 1/1989 | Duncan et al. | 715/257 |
| 4,830,618 A | * | 5/1989 | David | 434/169 |
| 5,604,897 A | | 2/1997 | Travis | |
| 5,649,222 A | | 7/1997 | Mogilevsky | |
| 5,659,771 A | | 8/1997 | Golding | |
| 5,765,180 A | | 6/1998 | Travis | |
| 5,787,451 A | | 7/1998 | Mogilevsky | |
| 6,085,206 A | | 7/2000 | Domini et al. | |
| 6,131,102 A | * | 10/2000 | Potter | 715/257 |
| 6,154,843 A | | 11/2000 | Hart, Jr. et al. | |
| 6,298,321 B1 | | 10/2001 | Karlov et al. | |

(Continued)

FOREIGN PATENT DOCUMENTS

| | | |
|---|---|---|
| GB | 2 343 037 A | 4/2000 |
| WO | WO 99/62000 A2 | 12/1999 |

OTHER PUBLICATIONS

Toutanova, Kristina and Moore, Robert C., Pronunciation modeling for improved spelling correction, ACL '02: Proceedings of the 40th Annual Meeting on Association for Computational Linguistics, 2001, pp. 144-151.*

(Continued)

Primary Examiner—Stephen S Hong
Assistant Examiner—Michael Scott
(74) Attorney, Agent, or Firm—Westman, Champlin & Kelly, P.A.

(57) ABSTRACT

A spell checking system includes a letter spelling engine. The letter spelling engine is configured to select a plurality of candidate letter target strings that closely match a misspelled source string. The spell checking system includes a phoneme spelling engine. The phoneme spelling engine is configured to select a plurality of candidate phoneme target strings that closely match the misspelled source string. A ranker module is configured to combine the candidate letter target strings and the candidate phoneme target strings into a combined list of candidate target strings. The ranker module is also configured to rank the list of candidate target strings to provide a list of best candidate target strings for the misspelled source string.

15 Claims, 7 Drawing Sheets

U.S. PATENT DOCUMENTS

| | | |
|---|---|---|
| 6,304,878 B1 | 10/2001 | Karlov et al. |
| 6,374,210 B1 | 4/2002 | Chu |
| 6,393,444 B1* | 5/2002 | Lawrence .................. 715/257 |
| 6,401,060 B1 | 6/2002 | Critchlow et al. |
| 6,424,983 B1* | 7/2002 | Schabes et al. ............. 715/257 |
| 6,601,059 B1 | 7/2003 | Fries |
| 6,675,169 B1 | 1/2004 | Bennett et al. |
| 6,684,185 B1* | 1/2004 | Junqua et al. ............... 704/243 |
| 6,694,296 B1* | 2/2004 | Alleva et al. ................ 704/255 |
| 6,879,951 B1* | 4/2005 | Kuo ............................ 704/10 |
| 6,889,361 B1 | 5/2005 | Bates et al. |
| 7,243,305 B2* | 7/2007 | Schabes et al. ............. 715/257 |
| 7,277,851 B1* | 10/2007 | Henton ....................... 715/257 |
| 7,523,102 B2* | 3/2008 | Schabes et al. ............. 715/257 |
| 7,428,491 B2* | 9/2008 | Wang et al. ................ 704/244 |
| 2002/0165873 A1 | 11/2002 | Kwok et al. |
| 2004/0093567 A1* | 5/2004 | Schabes et al. ............. 715/533 |
| 2004/0111475 A1 | 6/2004 | Schultz |
| 2005/0044495 A1* | 2/2005 | Lee et al. .................... 715/533 |
| 2005/0071332 A1 | 3/2005 | Ortega |
| 2005/0080772 A1 | 4/2005 | Bem |
| 2005/0257146 A1* | 11/2005 | Ashcraft et al. ............. 715/533 |
| 2006/0241944 A1* | 10/2006 | Potter et al. ................. 704/254 |
| 2008/0077859 A1* | 3/2008 | Schabes et al. ............. 704/235 |

OTHER PUBLICATIONS

Laplante, Phillip A., "Books/Definitions", Electrical Engineering Dictionary, 2000, CRC Press LLC, p. 519.*

Tucker, Allen B. and Wegner, Peter, "Computer Science Handbook", 2004, Taylor & Francis Group, LLC, Second Edition, p. 355*

Lindén, Krister, Evaluation of Linguistic Features for Word Sense Diambiguation with Self-Organized Document Maps, Computers and the Humanities, 2004, Kluwer Academic Publishers, pp. 417-435.*

U.S. Appl. No. 11/113,612, filed Apr. 25, 2005 entitled "Method and System for Generating Spelling Suggestions".

Official Action dated Jul. 3, 2008 in related case U.S. Appl. No. 11/113,612, filed Apr. 25, 2005.

International Search Report and Written Opinion in International Serial No, PCT/US06/09147, filed Mar. 14, 2006.

Official Action dated Dec. 23, 2008 in related case U.S. Appl. No. 11/113,612, filed Apr. 25, 2005.

Notice of Allowance and Fees Due dated Jun. 5, 2009 for U.S. Appl. No. 11/113,612, filed Apr. 25, 2005.

EPO Communication, Supplemental Search Report dated Jul. 15, 2010 for European Patent Serial No. 06 738 230.9.

* cited by examiner

|  |  | TARGET | | | | | | |
|---|---|---|---|---|---|---|---|---|
|  |  | * | f | ih | z | ih | k | ax | l |
| SOURCE | * | {} | {Ins:f} | {Ins:(f,ih)} | ... | ... | ... | ... | ... |
| | f | {Del(f)} | {} | {Ins:(ih)} | {Ins:(ih,z)} | ... | ... | ... | ... |
| | ih | {Del(f,ih)} | {Del:(ih)} | {} | {Ins:(z)} | {Ins:(z,ih)} | ... | ... | ... |
| | z | ... | {Del:(f,z)} | {Del:(z)} | {} | {Ins:ih} | {Ins:(ih,k)} | ... | ... |
| | ih | ... | ... | {Del:(z,ih)} | {Del:(ih)} | {} | {Ins:(k)} | {Ins:(k,ax)} | ... |
| | k | ... | ... | ... | {Del:(ih,k)} | {Del:(k)} | {} | {Ins:(ax)} | {Ins:(ax,l)} |
| | ax | ... | ... | ... | ... | {Del:(k,ax)} | {Del:(ax)} | {} | {Ins:(l)} |
| | l | ... | ... | ... | ... | ... | {Del:(ax,l)} | {Del:(l)} | {} |

|  |  | TARGET | | | | | | | | |
|---|---|---|---|---|---|---|---|---|---|---|
|  |  | * | p | h | y | s | i | c | a | l |
| SOURCE | * | {} | {Ins:p} | {Ins:(p,h)} | ... | ... | ... | ... | ... | ... |
|  | f | {Del(f)} | {Subs:(p←→f)} | {Subs:(p←→f),Ins:(h)} | {Subs:(p←→f),Ins:(h,y)} | ... | ... | ... | ... | ... |
|  | i | {Del(f,i)} | {Subs:(p←→f),Del:(i)} | {Subs:(p←→f), Subs:(h←→i)} | {Subs:(p←→f), Subs:(h←→i),Ins:(z)} | ... | ... | ... | ... | ... |
|  | z | ... | {Subs:(p←→f),Del:(i,z)} | {Subs:(p←→f), Subs:(h←→i),Del(z)} | {Subs:(p←→f), Subs:(h←→i), Subs:(y←→z)} | ... | ... | ... | ... | ... |
|  | i | ... | ... | ... | {Subs:(p←→f), Subs:(h←→i), Subs:(y←→z),Del:(i)} | ... | ... | ... | ... | ... |
|  | k | ... | ... | ... | ... | ... | ... | ... | ... | ... |
|  | l | ... | ... | ... | ... | ... | ... | ... | ... | ... |
|  | e | ... | ... | ... | ... | ... | ... | ... | ... | ... |

FIG. 9

SPELL CHECKING SYSTEM INCLUDING A PHONETIC SPELLER

BACKGROUND

Spelling correction is an important feature in many different types of software applications, such as word processing applications and email applications. When a character string or word includes spelling errors that result in invalid words, a lexicon-based spell checker can be used to suggest replacement words for the misspelled word. Such misspellings may occur due to a typo or an ignorance of the spelling of the word.

Conventional letter-type spell checking systems compare the words in the text entry to a lexicon of words and identifies the words in the text entry that are not found in the lexicon. For example, the spell checker would identify the text entry "animl" as being a misspelled word. One or more replacement words are often suggested for the misspelled word after determining an edit distance from the text entry to a target word. The edit distance represents the change that is required to form a valid alternative word. The word in the lexicon having the shortest edit distance from the typed invalid word is the first replacement word that is suggested to the user. Other replacement words can also be suggested that may contain more than one edit distance. For example, in the text entry "animl", the spell checker can suggest the closest match in the lexicon, which is "animal" having an edit distance of one. Other words from the lexicon can also be suggested that have an edit distance of greater than one. For example, the spell checker can suggest the words "anima" and "animate" as possible replacement words for the misspelled word.

Although conventional letter-type spell checking systems can correct various spelling errors by inserting letters, deleting letters, substituting letters and transposing letters, conventional letter-type spell checking systems are unable to suggest replacement words for phonetic-type spelling errors. Phonetic-type spelling errors include those types of spelling errors that are a result of spelling a word based on the way that it sounds. In addition, creating a spell checking system that consider phonetics would be a very expensive and difficult process for applying it across different languages. In general, programmers skilled in the different languages and idiosyncrasies of the different languages would be needed to hand-tune any sort of spell checker.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A spell checking system includes both a phoneme spelling engine and a letter spelling engine. The phoneme spelling engine is responsible for transforming a misspelled source string into candidate phoneme target strings. The letter spelling engine is responsible for transforming the misspelled source string into candidate letter target strings. The phoneme spelling engine converts the misspelled source string into a phoneme sequence string. While the letter spelling engine parses the misspelled source string into a letter sequence string. The candidate phoneme target strings and the candidate letter target string are combined into a list of candidate target strings. The combined list of candidate target strings are ranked such that a list of best candidate target strings are made available to a user.

BRIEF DESCRIPTION OF THE DRAWINGS

FIG. 6 illustrates an example letter-based trie structure.

FIG. 7 illustrates an example phoneme-based trie structure.

FIG. 8 illustrates a dynamically created grid for use in traversing a phoneme-based trie structure.

FIG. 9 illustrates a dynamically created grid for use in traversing a letter-based trie structure.

DETAILED DESCRIPTION

The following description of illustrative embodiments is described in accordance with a spell checking system for use in various kinds of software applications, such as word processing applications, email applications and text messaging applications. However, the description of illustrative embodiments can be used in other types of applications that can make use of a spell checking system. Before describing aspects of the illustrated embodiments, however, it may be useful to describe suitable computing environments that can incorporate and benefit from these aspects. Various applications that can make use of a spell checking system can be implemented in a networked environment of server computers and/or other computers. The computing environment shown in FIG. 1 is one such example.

Figure 1:
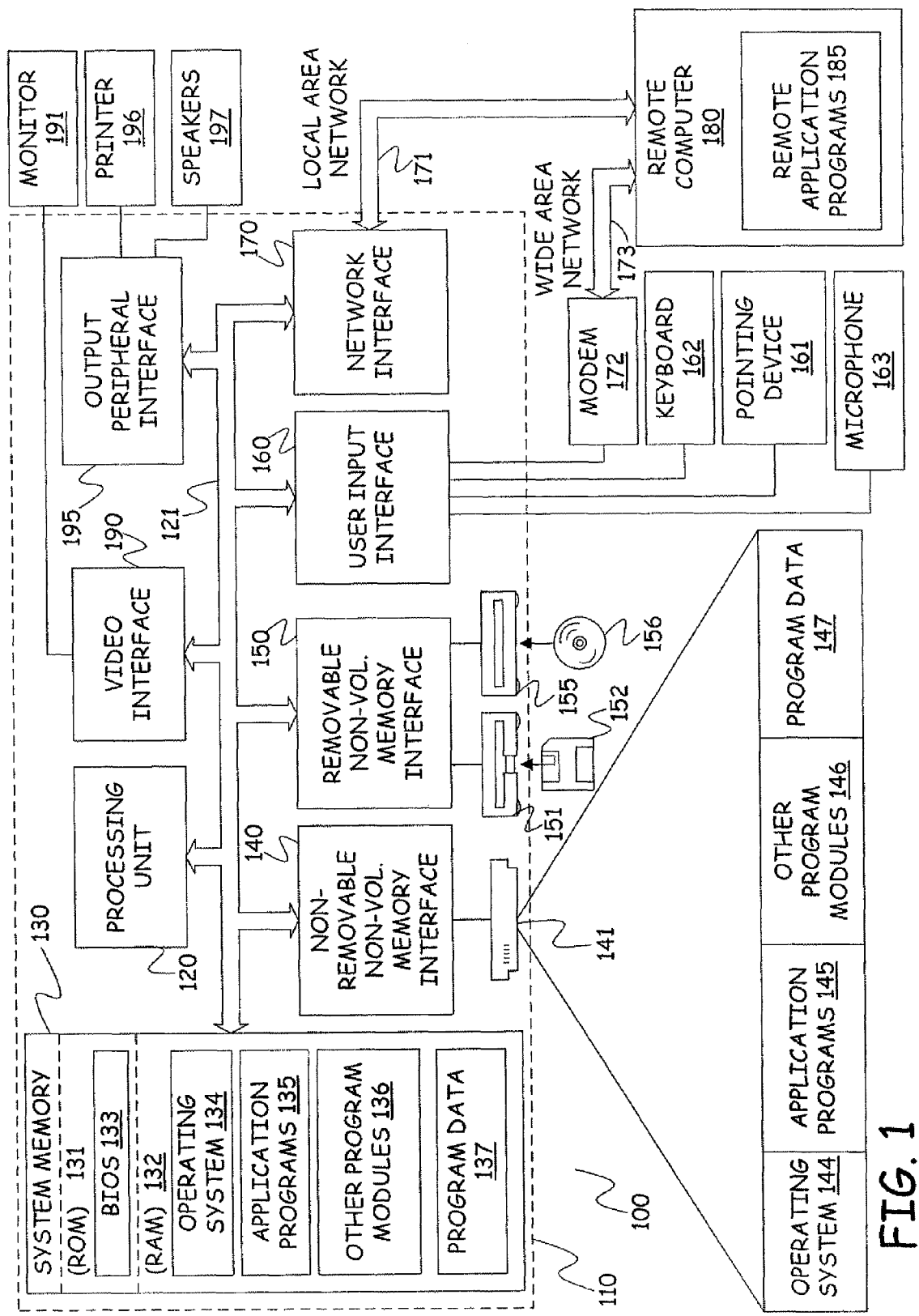
FIG. 1 illustrates a block diagram of a general computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable, non-volatile memory interface such as interface 140, and magnetic disk drive 151 and optical disk drive 155 are typically connected to the system bus 121 by a removable, non-volatile memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
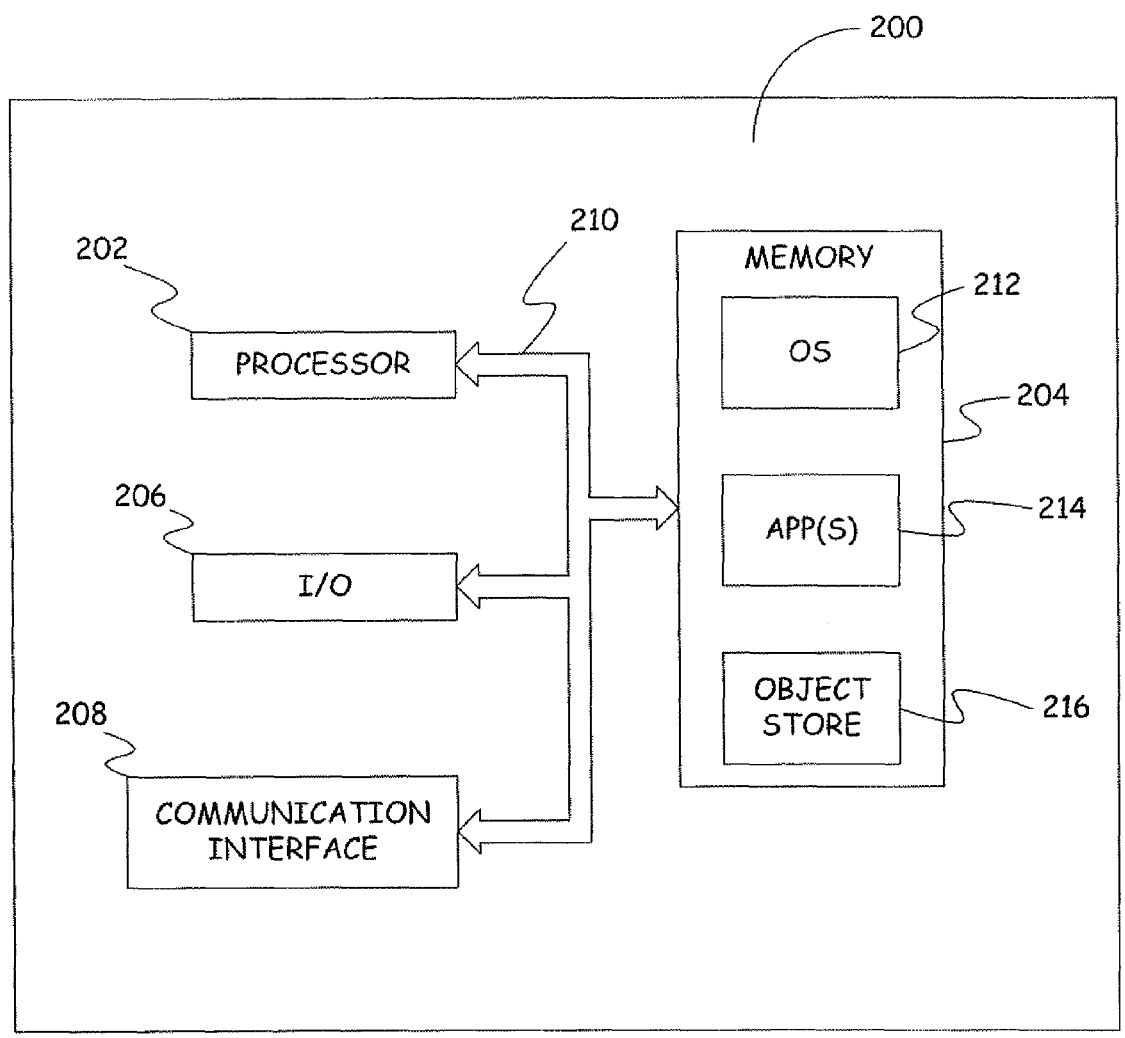
FIG. 2 illustrates a block diagram of a mobile device computing environment in which some embodiments may be practiced.

FIG. 2 is a block diagram of a mobile device 200, which is another exemplary computing environment for an application that used a spell checking system. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
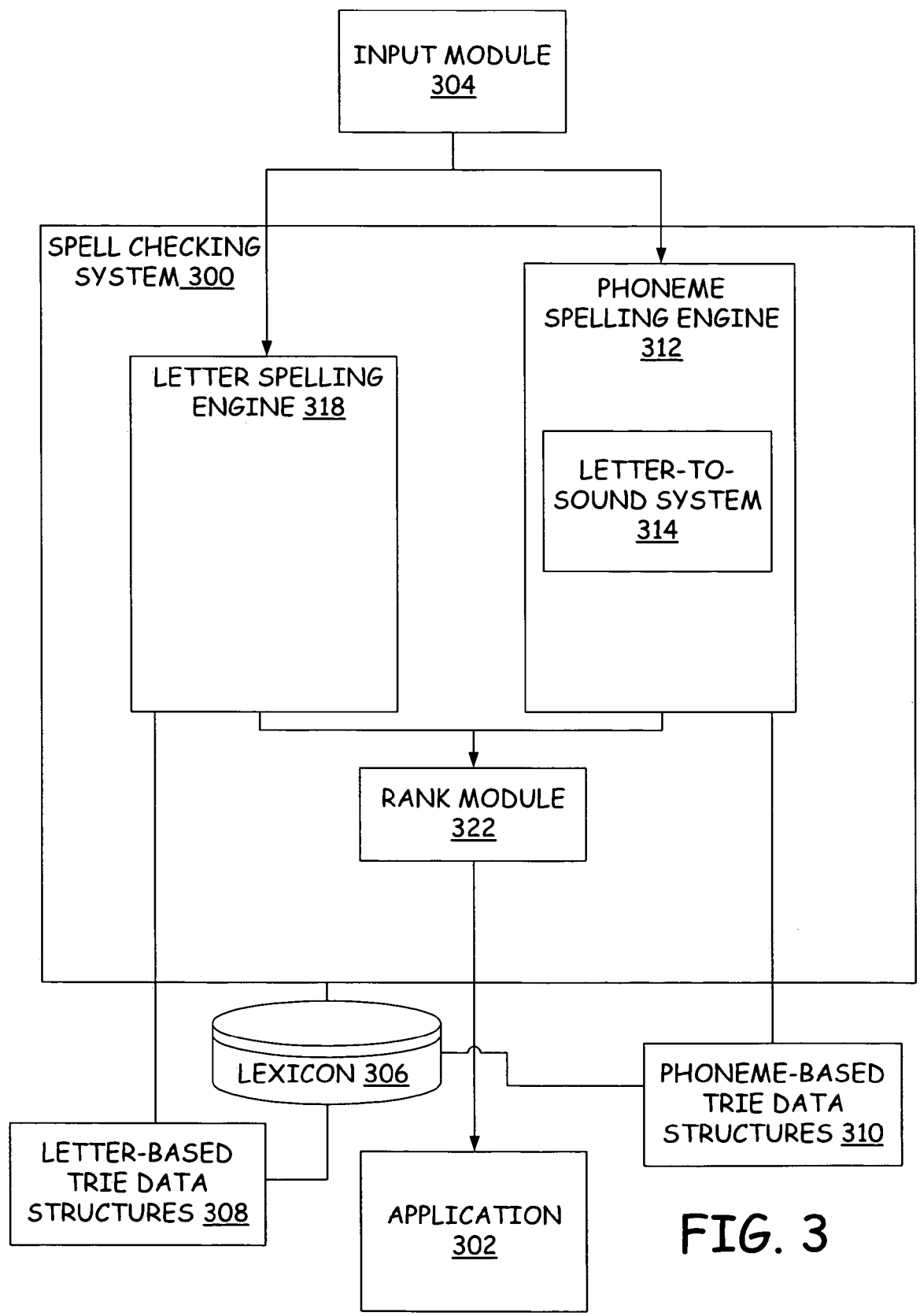
FIG. 3 is a block diagram illustrating use of a spell checking system for suggesting replacement words for a misspelled source string in an application.
Figure 4:
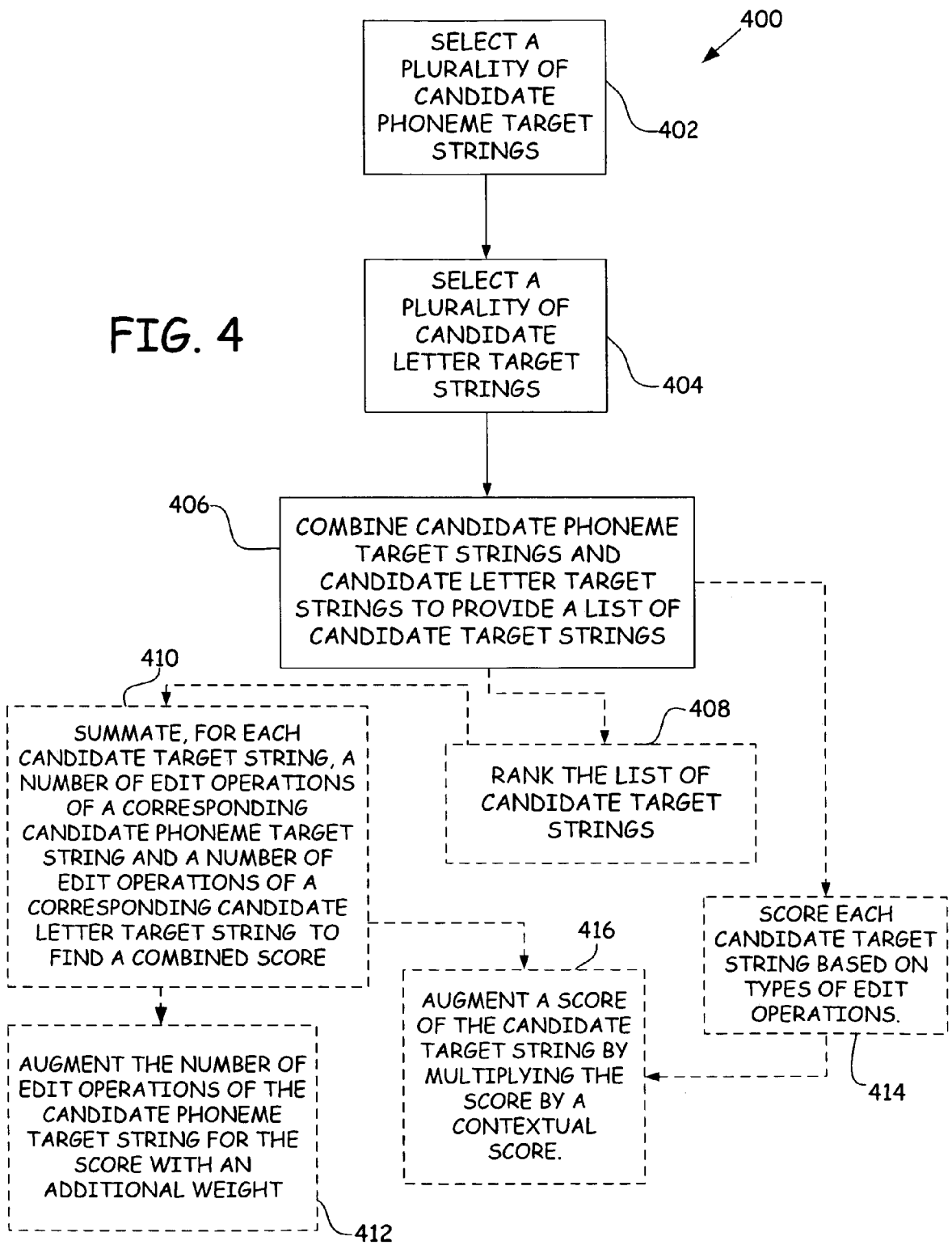
FIG. 4 is a flowchart illustrating a computer-implemented method of suggesting replacement target strings for a misspelled source string.
Figure 5:
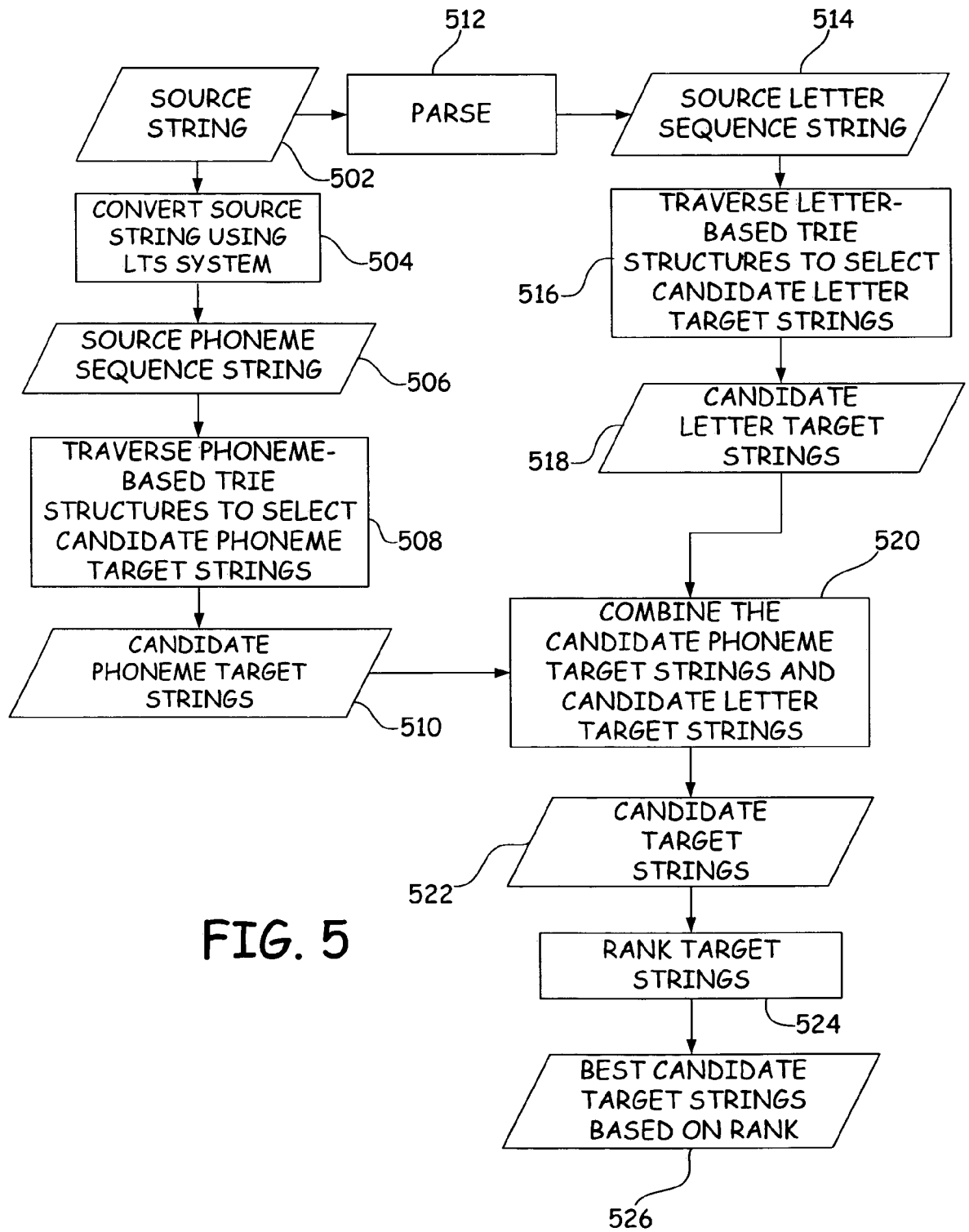
FIG. 5 is a detailed block diagram illustrating a process of which the spell checking system of FIG. 3 can implement.

FIG. 3 is a block diagram illustrating use of a spell checking system 300 for suggesting replacement words or target strings for a misspelled input word or source string in an application 302. For example, application 302 can be a word processing application, email application, text messaging application or other type of application that can utilize spell checking system 300. FIG. 4 is a flowchart 400 illustrating a computer-implemented method of suggesting replacement target strings for a misspelled source string. FIG. 5 is a detailed block diagram illustrating a process of which spell checking system 300 performs. The block diagram illustrated in FIG. 3 is configured to implement the method illustrated in FIG. 4. The block diagram illustrated in FIG. 5 illustrates a more detailed description of the process with which a misspelled source string 502 or input word undergoes to find replacement target words or target strings as implemented by FIG. 3.

Input module 304 illustrated in FIG. 3 is configured to receive a source string 502 (i.e., input word or phrase) as illustrated in FIG. 5. Input module 304 can be a keyboard (i.e., typed input) a microphone (i.e., dictated input) or other conventional input that is configured to receive source string 502. Alternatively, source string 502 can be retrieved from a preexisting document, a web page, or from other sources besides a keyboard or microphone.

Spell checking system 300 utilizes a lexicon 306. Lexicon 306 includes a comprehensive word list of correctly spelled words as well as a comprehensive phoneme list that corresponds with the word list. The phoneme list includes phonemes or sound units that act as the letters of pronunciation. The phonemes correspond with how a word sounds. The word list and the phoneme list are specific to a language of which the spell checking system 300 will be checking.

Spell checking system 300 also utilizes letter-based trie structures 308 and phoneme-based trie structures 310. Trie structures are data structures that effectively compress a word list or phoneme list into compact structures. Although letter-based trie structures 308 and phoneme-based trie structures 310 are illustrated as being separate from lexicon 306, it should be noted that in the alternative, letter-based trie structures 308 and phoneme-based trie structures 310 can be stored in lexicon 306.

FIG. 6 illustrates an example letter-based trie structure 600 for the words "animal", "animate" and "animosity". Letter-based trie structure 600 separates each letter of each of the words and illustrates how some of the letters are shared between words. At arrow 602, letter-based trie structure 600 reaches the word "animal". At arrow 604, letter-based trie structure 600 reaches the word "animate". At arrow 606, letter-based trie structure 600 reaches the word "animosity". Letter-based trie structures 308 (FIG. 3) are derived from lexicon 306.

FIG. 7 illustrates an example phoneme-based trie structure 700 for the words "physical" and "fizzle". A phoneme string for the word "physical" is {f, ih, z, ih, k, ax, l}. A phoneme string for the word "fizzle" is {f, ih, z, ax, l}. Phoneme-based trie structure 700 separates each phoneme of each of the phoneme strings and illustrates how some of the phonemes are shared between phoneme strings. At arrow 702, phoneme-based trie structure 700 reaches the word "fizzle". At arrow 704, phoneme-based trie structure 700 reaches the word "physical". It should be understood that in the phoneme space, the endpoints of certain phoneme strings can be multiple different words. For example, the phoneme string for the word "hear" is {hh, iy, r} and the phoneme string for the word "here" is {hh, iy, r}. The same phoneme string exists for both the word "hear" and "here". Determining the best candidate target string when a phoneme string can be multiple different words will be discussed in greater detail below.

Referring to flowchart 400 of FIG. 4 and the block diagram illustrated in FIG. 5, the computer-implemented method of suggesting replacement target strings for a misspelled source string includes the step of selecting a plurality of candidate phoneme target strings illustrated at block 402. In FIG. 3, spell checking system 300 includes a phoneme spelling engine 312 which is configured to implement step 402 of FIG. 4. Phoneme spelling engine 312 includes a letter-to-sound (LTS) system 314.

LTS system 314 is responsible for taking an input word (i.e. misspelled source string or word) and outputting a list of possible pronunciations for the input word. Typically this is done by outputting phonemes as previously discussed above. LTS system 314 is trained statistically by mapping human pronunciation of words to phonemes recognized by a speech-to-phoneme system. Typically, hundreds or thousands of examples are needed to train an LTS system properly. However, training an LTS system 314 does not require any highly refined, hand-tuned heuristics.

Referring to process 504 in the block diagram illustrated in FIG. 5, LTS system 314 is configured to convert the misspelled word or source string 502 into a source phoneme sequence string 506. For example, the source string 502 can be "fizikle". The user had intended to spell the word "physical", however, the user mistakenly spelled the word according to how it sounds. At process 504, LTS system 314 converts the source string (e.g. "fizikle") 502 into source phoneme sequence string {f, ih, z, ih, k, ax, l} 506.

Phoneme spelling engine 312 is responsible for accessing phoneme-based trie structures 310, traversing the phoneme-based trie structures 310 (illustrated at 508 in FIG. 5) and calculating edit distances between source phoneme sequence string 506 and different possible target phoneme sequence strings to select candidate phoneme target strings 510 that closely match the misspelled source string 502. To traverse target phoneme-based trie structures 310, phoneme spelling engine 312 dynamically creates and dynamically destroys a grid for each target phoneme-based trie structure 310. Since phoneme-based trie structures 310 are laid out sequentially, marching through a trie structure is tantamount to traversing the dynamically created grid from left to right. Edit distances are the number of edits or edit operations required to go from one sequence to another sequence. In this case, the edit distance is the amount of edit operations to go from source phoneme sequence string 506 to different possible target phoneme sequence strings. Typically, edit distances for transforming source phoneme sequence string 506 into candidate phoneme target strings 510 are calculated using phoneme-based trie structures 310 and the dynamically created grids. Therefore, marching through the phoneme-base trie structures and computing edit distances are substantially completed simultaneously and illustrated collectively at block 508 of FIG. 5. Those transformations that took a minimal number of edit operations between source phoneme sequence string 506 and candidate phoneme target strings 510 are those selected candidate phoneme target strings 510 that closely match the misspelled source string 502.

In accordance with the example discussed above, FIG. 8 illustrates a dynamically created grid 800. To determine the edit distance or number of edit operations, the source phoneme sequence string {f, ih, z, ih, k, ax, l} (i.e. left column) is compared to the target phoneme sequence string {f, ih, z, ih, k, ax, l} (i.e. top row) in grid 800. The total number of edits or edit operations is contained in the lower most right cell. In this example, the most efficient and lowest cost is to compare the source phoneme sequence string to the target phoneme sequence string by marching down the diagonal portion of the grid. Since the source phoneme sequence string is the same as the target phoneme sequence string, the edit distance is zero. However, if certain phonemes in the source phoneme sequence string were missing or were different, one would traverse grid 800 downward to delete an item, traverse grid 800 to the right to insert an item or traverse grid 800 diagonally if an item needs to be substituted or transposed.

It is time consuming to compute all edit operations for every phoneme sequence in lexicon 306. Therefore, computing edit operations for a phoneme sequence is pruned. To prune the process, a minimal number edit operations at any given point in the phoneme-based trie structure are permitted. If during the traverse, the number of edit operations supersedes this minimum number, the traversing of that phoneme-based trie is terminated. The easiest way to enforce this pruning process is to only compute entries in the grid that are a number of units away from the diagonal that is equal to the minimum number of acceptable edit operations. Generally, the minimum number of edit operations should be limited to two or less.

After phoneme spelling engine 312 traverses the phoneme-based trie structures 310 and calculates edit distances (as illustrated by process 508 in FIG. 5) using a dynamically created and destroyed grid, a set of candidate phoneme target strings 510 are available. These candidate phoneme target strings 510 are the lowest cost phoneme target strings or the phoneme target strings with the most minimal number of edit operations. In the illustrative example, plausible candidate phoneme target strings for the source "fizikle" can include "physical" or "fiscal".

Referring back to flowchart 400 of FIG. 4, the next step in the computer-implemented method of suggesting replacement target strings for a misspelled source string includes the step of selecting a plurality of candidate letter target strings 518 as illustrated at block 404. In FIG. 3, spell checking system 300 also includes a letter spelling engine 318 which is configured to implement step 404 of FIG. 4.

Referring to process 512 in the block diagram illustrated in FIG. 5, letter spelling engine 318 is configured to parse the misspelled source string 502 into a source letter sequence string 514. In the example discussed above, the misspelled source string 502 can be "fizikle". The user had intended to spell the word "physical", however, the user mistakenly spelled the word according to how it sounds. At process 512, letter spelling engine 318 parses the misspelled letter source string (e.g. "fizikle") 502 into a source letter sequence string {f, i, z, i, k, l, e} 514. Source letter sequence string 514 is a sequence of each of the individual letters of the misspelled letter source string 502.

Letter spelling engine 318 is also responsible for accessing letter-based trie structures 308, traversing the trie structures 308 (illustrated at 516 in FIG. 5) and calculating edit distances between source letter sequence string 514 and different possible target letter sequence strings to select candidate letter target strings 518 that closely match the misspelled source string 502. To traverse trie structures 308, letter spelling engine 318 dynamically creates and dynamically destroys a grid for each target structure 308. Since letter-based trie structures 308 are laid out sequentially, marching through a trie structure is tantamount to traversing the dynamically created grid from left to right. Edit distances are the number of edits or edit operations required to go from one sequence to another sequence. In this case, the edit distance is the amount of edit operations to go from source letter sequence string 514 to different possible target letter sequence strings. Typically, edit distances for transforming source letter sequence string 514 into candidate letter target strings 518 are calculated using letter-based trie structures 308 and the dynamically created grids. Therefore, marching through the letter-based trie structures and computing edit distances are substantially completed simultaneously and illustrated collectively at block 516 of FIG. 5. Those transformations that took a minimal number of edit operations are selected as the candidate letter target strings 518.

In accordance with the example discussed above, FIG. 9 illustrates a dynamically created grid 900. To determine the edit distance or number of edit operations, the source letter sequence string {f, i, z, i, k, l, e} (i.e. left column) is compared to the target letter sequence string {p, h, y, s, i, c, a, l} (i.e. top row) in grid 900. The total number of edits or edit operations is contained in the lower most right cell. In this example, the most efficient and lowest cost is to compare the source phoneme sequence string to the target phoneme sequence string by marching down the diagonal portion of the grid. Like grid 800 of FIG. 8 for traversing phoneme-based trie structures, letter spelling engine 318 traverses grid 900 downward to delete an item, traverse grid 900 to the right to insert an item or traverse grid 900 diagonally if an item needs to be substituted or transposed. Like phoneme spelling engine 312, the process of traversing trie structures in letter spelling engine 318 is pruned. To prune the process, a minimum number edit operations at any given point in the letter-based trie structure are permitted. Since each letter sequence item is going to need to be substituted for each letter in the letter-based trie structure in the example illustrated in FIG. 9, the number of edit operations would be much greater than a minimum number of two edit operations. In accordance, the traversing of this particular trie structure and dynamically created grid will be terminated. Therefore, letter spelling engine 318 will never select the target string "physical" as a candidate letter target string.

After engine 318 traverses the letter-based trie structures and calculates edit distances (as illustrated by process 516 in FIG. 5) using a dynamically created and destroyed grid, a set of candidate letter target strings 518 are available. These candidate letter target strings 518 are the lowest cost letter target strings or the letter target strings with the lowest amount of edit distances. In the illustrative example, plausible candidate letter target strings for the source "fizikle" can include "fizzle" or "fizzing".

Referring back to flowchart 400 of FIG. 4, the next step in the computer-implemented method of suggesting replacement target strings for a misspelled source string includes the step of combining candidate phoneme target strings 510 and candidate letter target strings 518 as illustrated at block 406. By combining candidate phoneme target strings 510 and candidate letter target string 518, a list of candidate target strings 522 is provided. This process is illustrated at 520 of FIG. 5. At block 408 of FIG. 4, the list of candidate target strings 522 is ranked. In FIG. 3, spell checking system 300 also includes a rank module 322. Rank module 322 is configured to implement steps 406 and 408 of FIG. 4.

Rank module 322 is configured to combine candidate phoneme target strings 510 (FIG. 5) and candidate letter target strings 518 (FIG. 5) to determine a list of candidate target strings 522. After providing a list of candidate target strings 522, rank module 322 is configured to rank the list of candidate target strings 522 In general, to rank the list of candidate target strings 522, each candidate target string is given a score. The following are descriptions of different embodiments that score and then rank candidate target strings 522.

In one embodiment and as illustrated in block 410 of FIG. 4, the total score of a candidate target string 522 (TotalScore(CandidateTargetString)) is the equivalent to the number of edit distances or edit operations that the source string 502 underwent to select the candidate target string 522. One way of accomplishing this is to summate, for each candidate target string 522, a number of edit operations or score of a corresponding candidate phoneme target string 510 (Score(CandidateLetterTargetString)) and a number of edit operations or score of a corresponding candidate letter target string 518 (Score(CandidatePhonemeTargetString)) to find a combined score. Such an equation is as follows:

Score(CandidateLetterTargetString)+Score(CandidatePhonemeTargetString)=TotalScore(CandidateTargetString)

As previously discussed in the above-described illustrative example, candidate phoneme target strings include "physical" and "fiscal", while candidate letter target strings include "fizzle" or "fizzing". In accordance with this illustrative example, none of the candidate phoneme target strings have a corresponding candidate letter target string or vice versa. Therefore, in this embodiment, the score for each candidate phoneme target string is the total score of the candidate target string and the score for each candidate letter target string is the total score of the candidate target string.

In another embodiment and as illustrated in block 412 of FIG. 4, the total score of a candidate target string 522 (TotalScore(CandidateTargetString)) equals the summation, for each candidate target string 522, of a number of edit operations or score of a corresponding candidate phoneme target string 510 (Score(CandidateLetterTargetString)) and a number of edit operations or score of a corresponding candidate letter target string 518 (Score(CandidatePhonemeTargetString)) as illustrated in block 408. In addition, the summation is augmented with an adjustable weight ($\alpha$) given to the score of the candidate phoneme target string as shown in the following equation:

Score(CandidateLetterTargetString)+($\alpha$*Score(CandidatePhonemeTargetString))=TotalScore(TargetString)

The adjustable weight ($\alpha$) multiplied to the score of the candidate phoneme target string can be any adjustable value. For example, if $\alpha$ is zero, then phonetic speller engine 312 is not considered in the total score for the target string. If $\alpha$ is one, then phonetic speller engine 312 is considered in the total score for the target string with same amount of weight as letter speller engine 318. If $\alpha$ is greater than one, then phonetic speller engine 312 is considered to be more useful than letter speller engine 318. It should be noted, however, that even though the general tendency is for the phoneme spelling engine to have better accuracy in finding target strings, in general a candidate phoneme target string having any greater than one edit distance will not be a good candidate target string.

In another embodiment and as illustrated in block 414 of FIG. 4, each candidate target string is scored based on types of edit operations that it underwent. Certain types of errors are more common than other types of errors. For example, changing an "e" to an "a" is more likely than replacing a "k" with a "w". Therefore, it can be beneficial to weight certain edit operations more or less than others. In this embodiment, vowel to vowel edit operations, edit operations that involve letters that are close together on the keyboard and edit operations that involve phonemes that have similar sounds can receive higher weights.

In this embodiment, instead of summating the scores of candidate phoneme target strings 510 and corresponding candidate letter target strings 518, a Score(edit) entry is used for ranking candidate target strings 522. Certain types of edits that are statistically frequently performed edits will have higher score than certain types of edits that are statistically infrequently performed edits. Therefore, certain types of edit operations underwent by source string 502 to select certain candidate target strings 522 will have higher scores than other candidate target strings. For example, substituting an "a" for an "e" (i.e. edit=Subst:(a,e)) can provide a candidate target string with a greater score than substituting a "p" for an "a" (i.e. edit=Subst:(p,a)) because a user can commonly mistake an "e" for an "a" while most user do not often mistake a "p" for an "a". This embodiment can be used on its own or in addition to the summation embodiments described above to improve target string scores.

In yet another embodiment and as illustrated in block 416 of FIG. 4, a score derived from either summating a number of edit operations of a corresponding candidate phoneme target string and a number of edit operations of a corresponding candidate letter target string (illustrated at block 410) to find a combined score for each candidate target string or scoring each candidate target string based types of edit operations (illustrated at block 414) can be multiplied by a contextual score. As discussed above, in the phoneme space, the endpoints of certain phoneme strings can be multiple different words. In the previous example, the phoneme string for the word "hear" is {hh, iy, r} and the phoneme string for the word "here" is {hh, iy, r}. The same phoneme string exists for both the word "hear" and "here". In this case, phoneme spelling engine 312 will have a difficult time knowing whether the target string should be the word "hear" or "here". Therefore, using a contextual spelling engine aids in determining whether the appropriate target string should be "hear" or "here".

A contextual spelling engine utilizes the words on either side of a misspelled word to help disambiguate the misspelled word and suggest replacement words. A contextual spelling engine is configured to match input words to subject words of a candidate table. Candidate replacement words and candidate scores from the candidate table that correspond with the matched subject words are extracted. Each candidate score is indicative of a probability that the input word should be replaced with the corresponding candidate replacement word. For example, the sentence "I want to send a form letter" versus the sentence "The letter was form a good friend" would yield different ranked suggestions for the misspelled word "firm". In this embodiment, the score derived either block 410 or 414 (Score(Speller)) is multiplied by the score found by a contextual spelling engine (Score(Context)) as is shown in the following equation:

Score(Speller)*Score(Context)=Score(Total)

It should be noted that the above embodiments for ranking the list of target strings is not an exhaustive. There are many ways to rank the output of a phoneme speller engine, a letter speller engine and a contextual speller engine involving heuristic and/or statistical means that employ sophisticated algorithms.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of ranking replacement target strings for a misspelled source string, the computer-implemented method comprising:
converting the misspelled source string into a source phoneme sequence using a letter-to-sound system;
utilizing a computer processor that is a component of the computer to traverse at least one phoneme-based trie structure so as to select a plurality of different candidate phoneme sequences based on a comparison of phonemes in the phoneme-based trie structure to the source phoneme sequence but without doing a direct comparison of every component of the plurality of different candidate phoneme sequences to a component of the source phoneme sequence;
generating a count for each different candidate phoneme sequence in said plurality of different candidate phoneme sequences, the count being indicative of a quantity of edit operations required to transform the candidate phoneme sequence into the source phoneme sequence;
utilizing the computer processor to select a limited number of the plurality of different candidate phoneme sequences based at least in part on said counts, the limited number being less than all of the different candidate phoneme sequences included in said plurality of different candidate phoneme sequences;
utilizing the computer processor to select a first set of replacement target strings, each replacement target string in the first set being selected based on direct correspondence to a candidate phoneme sequences in said limited number of different candidate phoneme sequences;
utilizing the computer processor to traverse at least one letter-based trie structure so as to select a plurality of different candidate letter sequences, wherein selecting the plurality of different candidate letter sequences comprises traversing the letter-based trie structure so as to identify the plurality of different candidate letter sequences without doing a direct comparison of every component of the plurality of different candidate letter sequences with every component of the misspelled source string;
utilizing the computer processor to select a limited number of the plurality of different candidate letter sequences based at least in part on a count of a quantity of edit operations required to transform each different candidate letter sequence included in the limited number of different candidate letter sequences into the misspelled source string, the limited number of different candidate letter sequences being less than all of the different candidate letter sequences included in said plurality of different candidate letter sequences;
utilizing the computer processor to select a second set of replacement target strings, each replacement target string in the second set being one of the candidate letter sequences in said limited number of the plurality of different candidate letter sequences; and
utilizing the computer processor to rank the replacement strings in the first and/or second sets based on a summation of the count of the quantity of edit operations required to transform a particular different candidate phoneme sequence included in the limited number of the plurality of different candidate phoneme sequences into the source phoneme sequence plus the count of the quantity of edit operations required to transform a particular different candidate letter sequence included in the limited number of the plurality of different candidate letter sequences into the misspelled source string.

2. The computer-implemented method of claim 1, wherein the phoneme-based trie structure is derived from a lexicon that includes the first and second sets of replacement target strings.

3. The computer-implemented method of 1, wherein selecting the plurality of different candidate letter sequences comprises parsing the misspelled source string to obtain a source letter sequence string.

4. The computer-implemented method of claim 1, wherein the letter-based trie structure is derived from a lexicon that includes the first and second sets of replacement target strings.

5. The computer-implemented method of claim 1, wherein said summation is augmented so as to apply an adjustable weight to at least one of the operations in the count of the quantity of operations required to transform the particular different candidate phoneme sequence included in the limited number of different candidate phoneme sequences into the source phoneme sequence or the operations in the count of the quantity of operations required to transform the particular different candidate letter string included in the limited number of different candidate letter sequences into the misspelled source string.

6. The computer-implemented method of claim 1, wherein said step of ranking the replacement strings in the first and/or second sets comprises ranking so as to account for assignment of a weighted bias scheme in which a weighted bias is assigned to some edit operations included in the count of the quantity of operations required to transform the particular different candidate phoneme sequence included in the limited number of different candidate phoneme sequences into the source phoneme sequence.

7. The method of claim 6, wherein said weighted bias scheme is based on types of edit operations, wherein statistically frequently performed edits are given a higher weighted bias than statistically infrequently performed edits.

8. The computer-implemented method of claim 1, wherein said step of ranking the replacement strings comprises summating, for each unique instance of a replacement string in the first and second sets, the count of the quantity of edit operations required to transform the candidate phoneme sequence included in the limited number of different candidate phoneme sequences into the source phoneme sequence plus the count of the quantity of edit operations required to transform the candidate letter string included in the limited number of different candidate letter sequences into the misspelled source string.

9. The computer-implemented method of claim 8, further comprising augmenting the summated value for each unique instance of a replacement string in the first and second sets by multiplying the summated value by a contextual score, the contextual score being derived by a formula that factors in words on either side of the misspelled source string.

10. The method of claim 8, wherein summating the quantity of edit operations required to transform the different candidate phoneme sequence plus the quantity of edit operations required to transform the different candidate letter string further comprises applying a weighting scheme so as to statistically favor frequently performed edits over infrequently performed edits.

11. The method of claim 1, wherein said particular different candidate phoneme sequence and said particular different candidate letter sequence correspond to a common replacement string, the common replacement string being included in both the first and second sets of replacement target strings.

12. The computer-implemented method of claim 1, wherein said step of ranking the replacement strings in the first and/or second sets comprises ranking so as to account for assignment of a weighted bias scheme wherein a weighted bias is assigned to favor some edit operations required to transform a particular different candidate letter string included in the limited number of different candidate letter sequences into the misspelled source string over others.

13. A computer-implemented spell checking system for ranking replacement target strings for a misspelled source string, the computer-implemented method comprising:
a phoneme spelling engine that selects sets of the replacement target strings for ranking by:
converting the misspelled source string into a source phoneme sequence using a letter-to-sound system;
utilizing a computer processor that is a component of the computer to traverse at least one phoneme-based trie structure so as to select a plurality of different candidate phoneme sequences based on a comparison of phonemes in the phoneme-based trie structure to the source phoneme sequence but without doing a direct comparison of every component of the plurality of different candidate phoneme sequences to a component of the source phoneme sequence;
generating a count for each different candidate phoneme sequence in said plurality of different candidate phoneme sequences, the count being indicative of a quantity of edit operations required to transform the candidate phoneme sequence into the source phoneme sequence;
utilizing the computer processor to select a limited number of the plurality of different candidate phoneme sequences based at least in part on said counts, the limited number being less than all of the different candidate phoneme sequences included in said plurality of different candidate phoneme sequences;
utilizing the computer processor to select a first set of replacement target strings, each replacement target string in the first set being selected based on direct correspondence to candidate phoneme sequences in said limited number of different candidate phoneme sequences;
a letter spell checking engine that utilizes the computer processor to select the replacement target strings that closely match the misspelled source target string by:
utilizing the computer processor to traverse at least one letter-based trie structure so as to select a plurality of different candidate letter sequences, wherein selecting the plurality of different candidate letter sequences comprises traversing the letter-based trie structure so as to identify the plurality of different candidate letter sequences without doing a direct comparison of every component of the plurality of different candidate letter sequences with every component of the misspelled source string;
utilizing the computer processor to select a limited number of the plurality of different candidate letter sequences based at least in part on a count of a quantity of edit operations required to transform each different candidate letter sequence included in the limited number of different candidate letter sequences into the misspelled source string, the limited number of different candidate letter sequences being less than all of the different candidate letter sequences included in said plurality of different candidate letter sequences;
utilizing the computer processor to select a second set of replacement target strings, each replacement target string in the second set being one of the candidate letter sequences in said limited number of the plurality of different candidate letter sequences; and
a ranker module utilizing the computer processor to rank the replacement strings in the first and/or second sets based on a summation of the count of the quantity of edit operations required to transform a particular different candidate phoneme sequence included in the limited number of the plurality of different candidate phoneme sequences into the source phoneme sequence plus the count of the quantity of edit operations required to transform a particular different candidate letter sequence included in the limited number of the plurality of different candidate letter sequences into the misspelled source string.

14. The spell checking system of claim 13, wherein the phoneme spelling engine traverses phoneme-based trie structures derived from a lexicon.

15. The spell checking system of claim 13, wherein the letter spelling engine traverses letter-based trie structures derived from a lexicon.

* * * * *